United States Patent
Fuchs et al.

(10) Patent No.: US 6,291,005 B1
(45) Date of Patent: Sep. 18, 2001

(54) PUMPABLE BAKING ADDITIVE

(75) Inventors: Dieter Fuchs, Melle; Baudouin Vicomte van Aefferden, Dissen, both of (DE)

(73) Assignee: Fuchs GmbH & Co., Melle (DE)

( * ) Notice: Subject to any disclaimer, the term of this patent is extended or adjusted under 35 U.S.C. 154(b) by 0 days.

(21) Appl. No.: 09/550,821

(22) Filed: Apr. 18, 2000

(30) Foreign Application Priority Data

Apr. 29, 1999 (DE) ................................ 199 19 195

(51) Int. Cl.[7] ................ A21D 2/22; A21D 2/24; A21D 2/34; A21D 2/36
(52) U.S. Cl. ................ 426/549; 426/653; 426/654
(58) Field of Search ................ 426/549, 454, 426/496, 573, 654, 662, 653

(56) References Cited

U.S. PATENT DOCUMENTS

| | | | |
|---|---|---|---|
| 4,935,249 | * 6/1990 | Pelletier | 426/62 |
| 5,185,173 | * 2/1993 | Bethke et al. | 426/549 |
| 5,306,633 | * 4/1994 | Gottschak et al. | 426/528 |
| 5,362,512 | * 11/1994 | Cabrera et al. | 426/601 |
| 5,650,188 | * 7/1997 | Gaubert et al. | 426/549 |

FOREIGN PATENT DOCUMENTS

| | | | |
|---|---|---|---|
| 0920806 A2 | * 11/1998 | (EP) | . |
| WO-9613980-A1 | * 5/1996 | (WO) | . |

* cited by examiner

Primary Examiner—Nina Bhat
(74) Attorney, Agent, or Firm—Amster, Rothstein & Ebenstein

(57) ABSTRACT

A pumpable baking additive for improving the quality of backed goods with a viscosity of at least approximately 500 mPas$^{-1}$ and a water activity ($a_w$) of approximately $\leq 0.94$ is physically and microbiologically stable for several weeks without cooling.

8 Claims, No Drawings

PUMPABLE BAKING ADDITIVE

BACKGROUND OF THE INVENTION

This invention concerns a pumpable baking additive or baking agent for use in the baking industry and a method of producing baked goods using this agent.

As a rule, baked goods are produced by kneading additional baking enhancing ingredients (baking additives) together with water, flour, salt and yeast to form a homogeneous mixture which is then allowed to rise, cut into portions and baked.

The sensory properties and the development of baked volume are influenced to a significant extent by baking additives and the fermentation process. Additives that optimize taste may be used in the form of a powder, paste, viscous mass or in very rare cases a liquid. The number of baking additives, weighing them, dosing them and keeping all the equipment clean are a challenge for a continuous production process.

Therefore, prefabricated mixes of ingredients have been used for some time in large-scale baking operation. For example, WO 96/13980 describes a liquid baking additive in the form of an aqueous suspension containing up to 40% by weight of substances that are supposed to influence the taste of the baked goods. This pumpable baking additive contains at least 60% water and is delivered to large-scale bakeries in containers, for example. However, such liquid baking additives have only a low stability, because phase separation occurs a short time after the ingredients are mixed with water, possibly resulting in formation of three-phase systems. Therefore, there have also been proposals for supplying this baking additive in containers equipped with stirring mechanisms. However, the microbiological stability of this product is not satisfactory, so that this baking additive is microbiologically safe for only a short period of time, even under refrigeration.

Therefore, the object of this invention is to provide a baking additive that is pumpable but remains homogeneous and microbiologically stable for a long period of time.

SUMMARY OF THE INVENTION

This object is achieved with a baking additive (baking agent) with a viscosity of at least 500 mPas$^{-1}$ and a water activity ($a_w$) of approximately $\leq 0.94$. Subject matter of this invention is also a baking method using the baking additive according to this invention.

The dynamic viscosity was determined with a rotational viscometer that operates according to the Searle principle. The water activity ($a_w$) is the quotient of the water vapor pressure over the substrate and the vapor pressure of pure water at the same temperature. It can be determined with an Aqualab CX2 apparatus. Although a water activity ($a_w$) of $\leq 0.94$ alone can guarantee the microbiological stability of the product, it does not guarantee its physical stability. It was surprising that the viscosity of the baking additive prevents the separation of the solid components, aqueous and/or oily components and thus prevents the development of a two-phase or three-phase system and the baking additive remains pumpable nevertheless. The physical and microbiological stability of the baking additive according to this invention is maintained for a long period of time even without refrigeration.

PREFERRED EMBODIMENTS OF THE INVENTION

According to a preferred embodiment of this invention, the water activity ($a_w$) of the baking additive amounts to approximately 0.7 to 0.8. The total water content of the baking additive according to this invention amounts to at most approximately 50 percent by weight, based on the weight of the baking additive.

According to another preferred embodiment of this invention, the liquid baking additive has a pH value of approximately $\leq 4.5$, preferably approximately 2.0 to 3.5 and ideally approximately 2.5. Achieving this pH range also promotes the microbiological stability of the baking additive.

Ingredients of the baking additive according to this invention may include the thickeners, grain products, sugars, milk products, salt, egg products, edible fats and edible oils, food additives according to the Additive Approval Regulations, flavorings and enzymes that are conventionally used in the food technology industry.

Suitable thickeners include, for example, starch, gelatin, agar, pectin products, guar gum, carob flour and xanthans. Hydrocolloids are especially preferred. The concentration of the thickeners is selected so that ultimately the desired viscosity according to this invention is achieved. It may preferably be 1 to 10 percent by weight.

Suitable sugars include monosaccharides and disaccharides, such as glucose, maltose, fructose, mannose, sucrose, lactose, maltodextrins and invert sugar. They can be added in the form of powders, solutions, in particular syrups, to prepare the baking additive according to this invention. The concentration of the sugars in the baking additive may be up to 25 percent by weight, preferably 5 to 10 percent by weight, based on the weight-of the baking additive.

The baking additive may contain milk products. Suitable milk products include whole milk powder, skim milk powder, buttermilk powder, yogurt powder, cottage cheese powder, whey powder and milk protein. These ingredients are used to make the crumb of the baked goods finer, to round out the taste and enrich the nutritional value.

The edible oils and edible fats may include those of animal or vegetable origin. They are present in the baking additive according to this invention in a maximum amount of 40 percent by weight, preferably 3 to 10 percent by weight.

Food additives suitable for the purpose according to this invention according to the Additive Approval Regulations include, for example, the calcium salts such as calcium carbonate, calcium oxide, calcium phosphates, calcium sulfate, sodium and potassium chloride, alkali sulfates or alkali hydrogen sulfates, ammonium sulfate, ammonium chloride, acids and their acid addition salts such as sorbic acid, acetic acid, propionic acid, lactic acid and calcium lactate, malic acid, fumaric acid, tartaric acid, citric acid, ascorbic acid, and amino acids such as L-cysteine.

The concentration of the acids and the salts which influence the pH value is preferably selected so that the pH range indicated above is achieved. Furthermore, substances which act as emulsifiers may also be present. These include, for example, mono- and diglycerides of edible fatty acids, lecithin, diacetyltartaric acid glycerides and mixtures thereof.

Additional ingredients of the baking additive according to this invention may include fiber substances such as wheat fiber, soybean shells, wheat bran, barley bran and oat bran, flavoring agents such as maltol and malt extract. Yeast may also be used in the baking additive, but preferably it does not contain yeast.

Enzymes that may be included in the baking additive according to this invention include in particular amylases, proteases and lipoxygenases.

To prepare the baking additive according to this invention, the ingredients (except for the emulsifiers, enzymes, water and other heat-sensitive ingredients) are mixed while heating to 80 to 95° C., for example. After cooling the mixture to approximately 60° C., water, emulsifiers, oil and then vitamins, enzymes or other unstable proteins or protein-containing additives are added. The resulting mixture can be homogenized while adding the additional additives or afterwards.

A baking additive according to this invention may contain, for example, 0.5 to 10 percent by weight thickener, 1.0 to 10 percent by weight acids or minerals, 5 to 30 percent by weight sugars, 0 to 40 percent by weight edible fats or edible oils, 3 to 5 percent by weight emulsifiers, 10 to 15 percent by weight malt extract and 20 to 45 percent by weight water, each based on the total weight of the baking additive. Preferably approximately 0.2 percent by weight antioxidant, such as ascorbic acid, and approximately 0.005 percent by weight cysteine, each based on the total weight of the baking additive, are also used.

To prepare baked goods, the baking additive according to this invention is mixed with flour, and then yeast, salt and water are added. The dough is allowed to rise, divided into portions and baked to yield the desired product in a known way.

This invention will now be explained on the basis of the following recipes which are given as examples and their preparation.

EXAMPLE 1

A baking additive according to recipe 1 was prepared. All the ingredients except those of positions 1 through 4 and 9 were mixed and brought to a boil while stirring. After cooling to approximately 60° C., the other ingredients were stirred into the mixture. With further cooling sebsequently, the mixture was homogenized and then poured into canisters.

The ph value of the resulting baking additive is 2.5, the activity $(a_w)$ is 0.94. The viscosity is 14,250 mPas$^{-1}$, measured with a Haake Viscotester VT51/R, R3 spindle, at ° C., 4 t/min, 90 seconds.

|   | Recipe 1 - ingredients | Amount (%) |
|---|---|---|
| 1 | emulsifier mixture | 6.71 |
| 2 | amylase | 0.39 |
| 3 | lecithin | 3.61 |
| 4 | ascorbic acid | 0.23 |
| 5 | calcium pyrophosphate | 0.27 |
| 6 | malt extract | 13.55 |
| 7 | glucose syrup | 4.52 |
| 8 | flavoring | 0.015 |
| 9 | soybean oil | 4.52 |
| 10 | water | 40.66 |
| 11 | calcium sulfate | 2.26 |
| 12 | cysteine | 0.005 |
| 13 | sugar | 10.84 |
| 14 | dextrose | 2.26 |
| 15 | lactose | 7.09 |
| 16 | starch | 2.62 |
| 17 | powdered guar gum | 0.45 |
|   |   | Σ100.0 |

EXAMPLE 2

A baking additive according to recipe 2 was prepared. All the ingredients except those of positions 1 through 4 and 10 were mixed and brought to the boil while stirring. After cooling to approximately 60° C., the other ingredients were added. When the mixture was then cooled further, it was homogenized and then poured into canisters.

The ph value of the resulting baking additive was 2.5, and the water activity $(a_w)$ was 0.94. The viscosity was 6,300 mPas$^{-1}$, measured with a Haake Viscotester, R4 spindle at 20° C., 4 t/min, 90 seconds.

|   | Recipe 2 - ingredients | Amount (%) |
|---|---|---|
| 1 | emulsifier mixture | 6.7 |
| 2 | amylase | 0.387 |
| 3 | lecithin | 3.61 |
| 4 | ascorbic acid | 0.23 |
| 5 | calcium pyrophosphate | 0.27 |
| 6 | malt extract | 13.53 |
| 7 | glucose syrup | 4.51 |
| 8 | sugar | 10.82 |
| 9 | dextrose | 2.25 |
| 10 | soybean oil | 4.51 |
| 11 | water | 42.8551 |
| 12 | calcium sulfate | 2.25 |
| 13 | lactose | 7.08 |
| 14 | cysteine | 0.0045 |
| 15 | hydrocolloid | 0.99 |
| 16 | flavoring | 0.0034 |
| 3 |   | 100.0% |

EXAMPLE 3

A baking additive was prepared according to recipe 3. All the ingredients except those of items 1 through 4 and 9 were mixed and brought to a boil while stirring. The other ingredients were added after cooling to approximately 60° C. When subsequently cooled further, the mixture was homogenized and then poured into canisters.

The pH value of the resulting baking additive was 2.7, and the water activity $(a_w)$ was 0.71. The viscosity was 6,610 mpas$^{-1}$, measured with a Haake Viscotester using the R4 spindle at 20° C., 4 t/min, 90 seconds.

|   | Recipe 3 - ingredients | Amount (%) |
|---|---|---|
| 1 | emulsifier mixture | 5.374 |
| 2 | amylase | 0.31 |
| 3 | lecithin | 2.89 |
| 4 | ascorbic acid | 0.18 |
| 5 | calcium pyrophosphate | 0.22 |
| 6 | malt extract | 10.84 |
| 7 | glucose syrup | 3.61 |
| 8 | sugar | 8.67 |
| 9 | dextrose | 1.81 |
| io | soybean oil | 3.61 |
| 11 | water | 34.33 |
| 12 | calcium sulfate | 1.81 |
| 13 | lactose | 5.67 |
| 14 | cysteine | 0.0036 |
| 15 | hydrocolloids | 0.7973 |
| 16 | edible salt | 19.8751 |

We claim:

1. A pumpable baking additive having a viscosity of at least approximately 500 mPas$^{-1}$ and a water activity $(a_w)$ of approximately $\leq 0.94$.

2. A baking additive according to claim 1 wherein the water activity $(a_w)$ is approximately 0.7 to 0.8.

3. A baking additive according to claim 1 wherein the pH of the baking additive is approximately $\leq 4.5$.

4. A baking additive according to claim 3 wherein the pH of the baking additive is approximately 2.0 to 3.5.

5. A method of producing baked goods, comprising the steps of mixing a flour with a baking additive having a viscosity of at least approximately 500 mPas$^{-1}$ and a water activity ($a_w$) of approximately $\leq 0.94$ and using the mixture to prepare baked goods.

6. A method according to claim 5 wherein the water activity ($a_w$) of the baking additive is about 0.7 to 0.8.

7. A method according to claim 5 wherein the pH of the baking additive is approximately $\leq 4.5$.

8. A method according to claim 7 wherein the pH of the baking additive is approximately 2.0 to 3.5.

* * * * *